(12) United States Patent
Tsai et al.

(10) Patent No.: US 7,681,350 B2
(45) Date of Patent: Mar. 23, 2010

(54) FLAT PANEL DISPLAY HAVING HOLDING STRUCTURE FOR THIN INSERTIONS

(75) Inventors: Meng-Tse Tsai, Miao-Li (TW);
Chen-Yu Wu, Miao-Li (TW);
Hsiao-Yuan Ho, Miao-Li (TW);
Chi-Wen Chiang, Miao-Li (TW);
Che-Min Huang, Miao-Li (TW);
Yung-Hsiang Chen, Miao-Li (TW)

(73) Assignee: Innolux Display Corp., Mia-Li County (TW)

( * ) Notice: Subject to any disclaimer, the term of this patent is extended or adjusted under 35 U.S.C. 154(b) by 559 days.

(21) Appl. No.: 11/642,035

(22) Filed: Dec. 19, 2006

(65) Prior Publication Data
US 2008/0123269 A1 May 29, 2008

(30) Foreign Application Priority Data
Dec. 23, 2005 (TW) .............................. 94222586 U

(51) Int. Cl.
*B41J 11/02* (2006.01)
(52) U.S. Cl. ..................................... 40/725; 248/918
(58) Field of Classification Search .................. 40/725, 40/781; D14/448; 248/442.2, 918; 348/818, 348/834
See application file for complete search history.

(56) References Cited

U.S. PATENT DOCUMENTS

| | | | | |
|---|---|---|---|---|
| 4,427,264 A | * | 1/1984 | Kamerling | 359/601 |
| 5,328,145 A | * | 7/1994 | Charapich | 248/442.2 |
| 6,478,282 B1 | * | 11/2002 | Flemming | 248/442.2 |
| 6,870,582 B2 | | 3/2005 | Hayashimoto et al. | |
| D508,054 S | * | 8/2005 | Ramsey | D14/448 |
| D508,695 S | * | 8/2005 | Vaughn | D14/448 |
| D522,007 S | * | 5/2006 | Cano | D14/448 |
| 2006/0198087 A1 | * | 9/2006 | Anderson et al. | 361/681 |

* cited by examiner

*Primary Examiner*—Cassandra Davis
(74) *Attorney, Agent, or Firm*—Wei Te Chung

(57) ABSTRACT

An exemplary flat panel display (1) includes a main body (10) and a transparent holding structure (12) fixed to the main body. The holding structure is configured to hold one or more thin insertions by itself at a side thereof and or by cooperation with the main body wherein one or more thin insertions are held between the holding structure and the main body at a side of the holding structure.

7 Claims, 5 Drawing Sheets

FLAT PANEL DISPLAY HAVING HOLDING STRUCTURE FOR THIN INSERTIONS

FIELD OF THE INVENTION

The present invention relates to flat panel displays (FPDs), and more particularly to a flat panel display having a holding structure for holding thin insertions such as paper notes, cards, photos, etc.

GENERAL BACKGROUND

Flat panel displays are commonly used as display devices for electronic apparatuses such as personal computers (PCs). Referring to FIG. 5, a typical flat panel display 5 includes a front frame 52, a back cover 54, and a display panel 56. The front frame 52 and the back cover 54 cooperatively define a space (not labeled). The display panel 56 is received in the space.

Many users of PCs attach small paper notes on the front frame 52 of the flat panel display 5, in order to conveniently remember or convey written information such as notices, messages, or telephone numbers. Often the paper used is adhesive paper such as, for example, Post-Its. However, these kinds of paper notes are liable to fall off from the front frame 52. In addition, if the paper used is adhesive paper, residual adhesive may remain on the front frame 52 after the note has been removed. Residual adhesive may build up on the front frame 52 over time, and make the flat panel display 5 somewhat unsightly.

What is needed, therefore, is a flat panel display that can overcome the above-described deficiencies.

SUMMARY

In one preferred embodiment, a flat panel display includes a main body and a transparent holding structure fixed to the main body. The holding structure is configured (i.e., structured and arranged) to hold one or more thin insertions by itself at a side thereof and or by cooperation with the main body wherein one or more thin insertions are held between the holding structure and the main body at a side of the holding structure Other aspects, advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe the preferred embodiments in detail.

Figure 1:
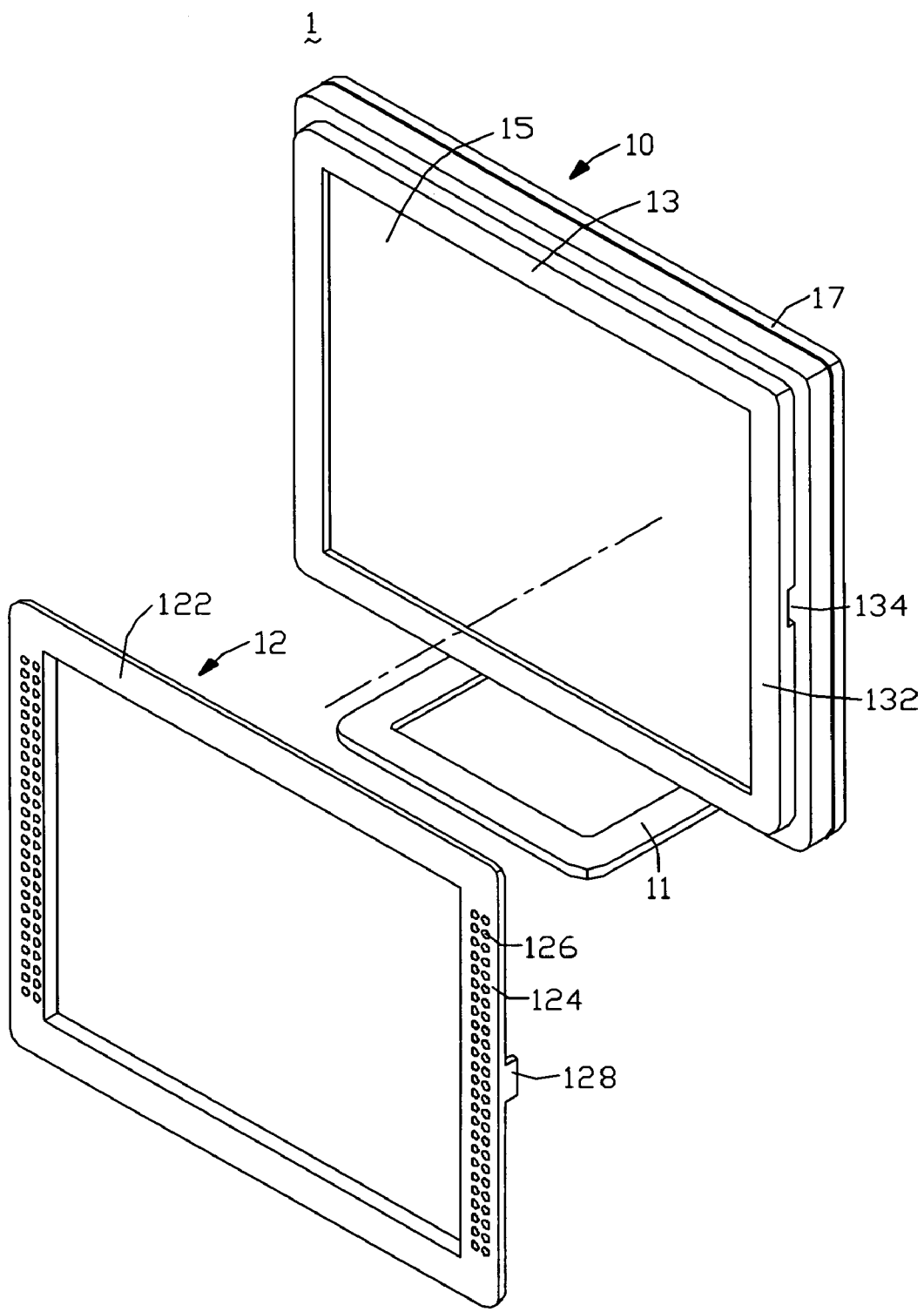
FIG. 1 is an exploded, isometric view of a flat panel display according to a first embodiment of the present invention, the flat panel display including a main body and a holding frame separated from the main body.

Referring to FIG. 1, a flat panel display 1 according to a first embodiment of the present invention is shown. The flat panel display 1 includes a main body 10, a base 11, and a holding frame 12.

The main body 10 includes a front frame 13, a display panel 15, and a back cover 17. The front frame 13 and the back cover 17 cooperatively define a space (not labeled). The display panel 15 is received in the space. The main body 10 is supported by the base 11.

The front frame 13 is generally rectangular, and includes four first side walls 132 connected end to end, thus defining a window (not labeled) for allowing viewing of the display panel 15. Two grooves 134 are respectively defined in two opposite sides of the main body 10. In the illustrated embodiment, the grooves 134 are defined in middle portions of two vertical side walls 132, and are adjacent the back cover 17. The front frame 13 should preferably be made from plastic, polymer or other suitable materials.

The back cover 17 is generally box-shaped, and a size and a width thereof are respectively greater than those of the front frame 13. The back cover 17 is preferably made from plastic, polymer, or another suitable material.

The holding frame 12 is generally rectangular and transparent, and has a size substantially equal to that of the front frame 13. The holding frame 12 includes two opposite horizontal walls 122, and two opposite vertical walls 124 respectively connected end to end with the horizontal walls 122. A plurality of protrusions 126 extend from a back surface (not labeled) of each vertical wall 124 of the holding frame 12. In the illustrated embodiment, the protrusions 126 of each vertical wall 124 are regularly arranged in two columns. The holding frame 12 further includes two blocks 128 (only one shown) respectively outwardly protruding toward the main body 10. The blocks 128 protrude from central edge portions (not labeled) of the vertical walls 124, and are each positioned corresponding to their respective grooves 134 in the front frame 13. Each block 128 and the respective groove 134 are configured (i.e., structured and arranged) so that they can be cooperatively fixed to each other. In the illustrated embodiment, the block 128 includes a hooked end (not shown) positioned adjacent to the protrusions 126, and the groove 134 includes a corresponding hooked inner structure (not shown) that can hook on to the hooked end of the block 128. Outside corners (not labeled) of the holding frame 12, the front frame 13, and the back cover 17 are substantially rounded.

Figure 2:
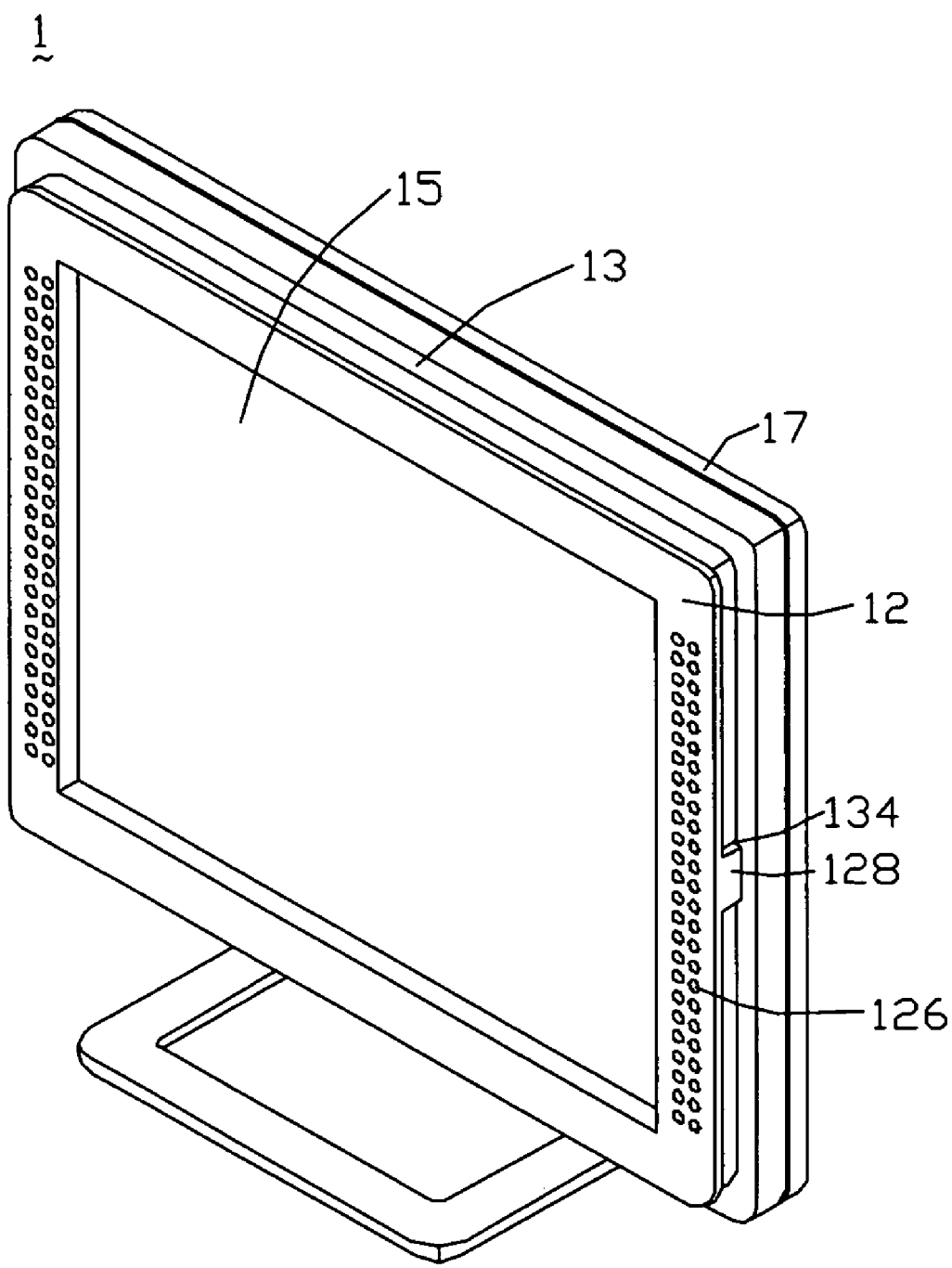
FIG. 2 is an assembled view of the flat panel display of FIG. 1, the holding frame being assembled to the main body.

Referring also to FIG. 2, when the holding frame 12 is assembled to the main body 10, the blocks 128 are each fittingly received and fixed in their respective grooves 134, and the protrusions 126 abut or gently press the front frame 13. Therefore, thin objects (not shown) such as pieces of paper, cards, photos, and so on can be cooperatively held by the front frame 13 and the protrusions 126 of the holding frame 12. The objects can be adhesive or non-adhesive. Because the holding frame 12 is transparent, the contents of the held objects can be conveniently read by anyone looking at the flat panel display 1. Thus, the flat panel display 1 can provide desired convenience with a clean appearance.

Figure 3:
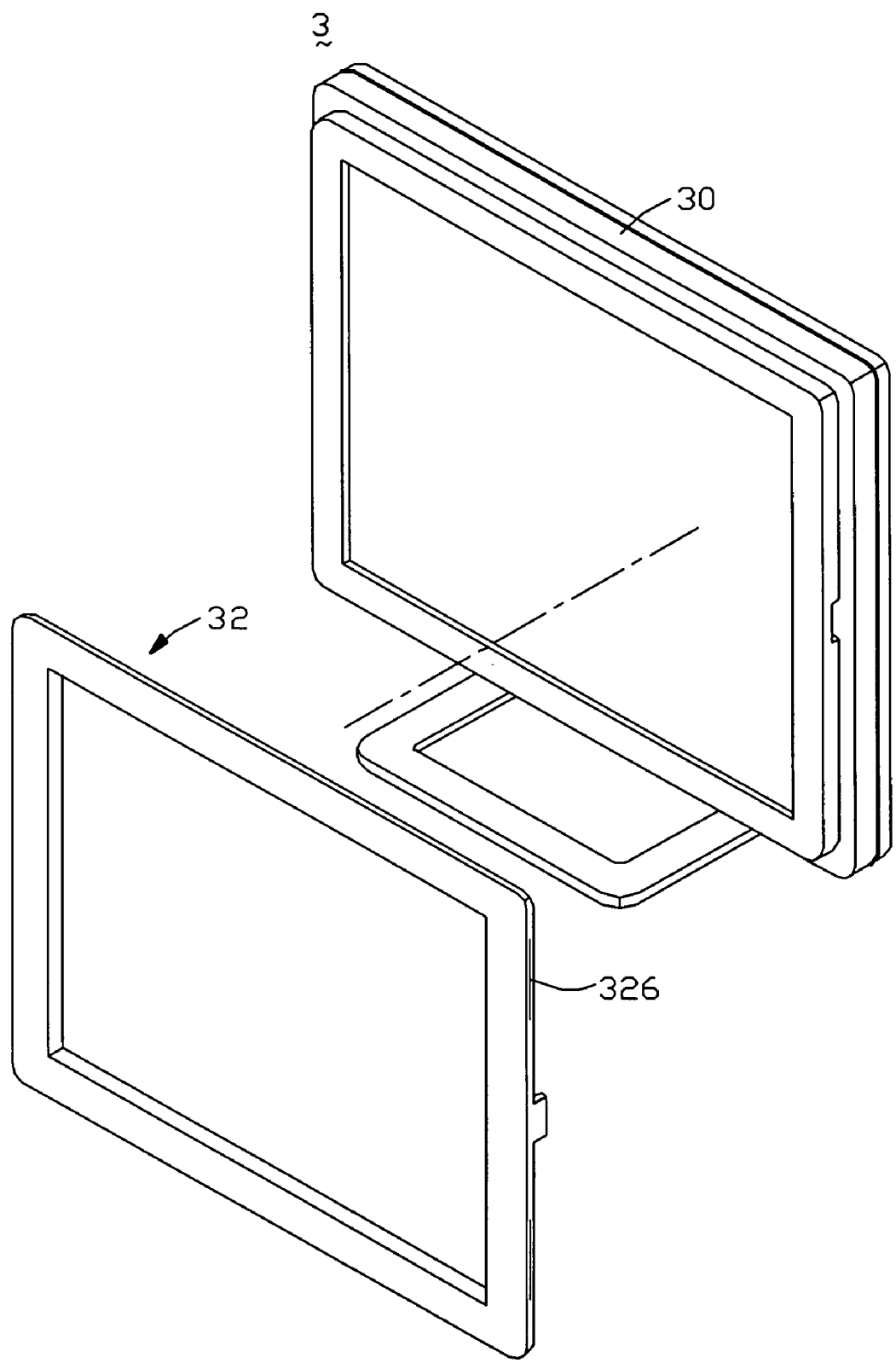
FIG. 3 is an exploded, isometric view of a flat panel display according to a second embodiment of the present invention, the flat panel display including a main body and a holding frame separated from the main body.

Referring to FIG. 3, a flat panel display 3 according to a second embodiment of the present invention is similar to the flat panel display 1. However, the flat panel display 3 includes a main body 30 and a transparent holding frame 32. The holding frame 32 defines two pairs of slim cavities 326 at two opposite vertical sides (not labeled) thereof, and entrances (not labeled) to the slim cavities 326 are rounded. Surfaces (not labeled) of the holding frame 32 facing the main body 30 are essentially smooth.

Figure 4:
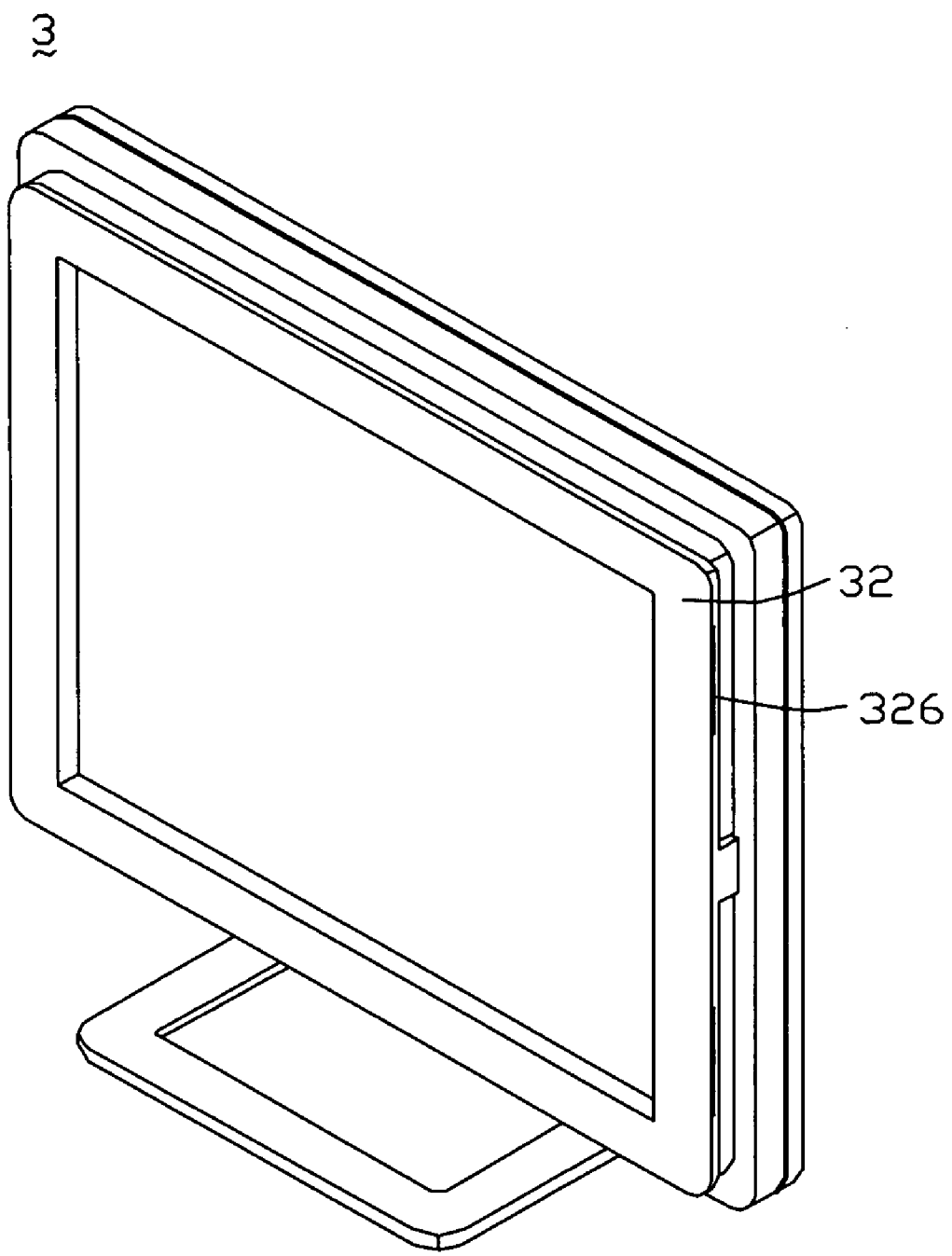
FIG. 4 is an assembled view of the flat panel display of FIG. 3, the holding frame being assembled to the main body.
Figure 5:
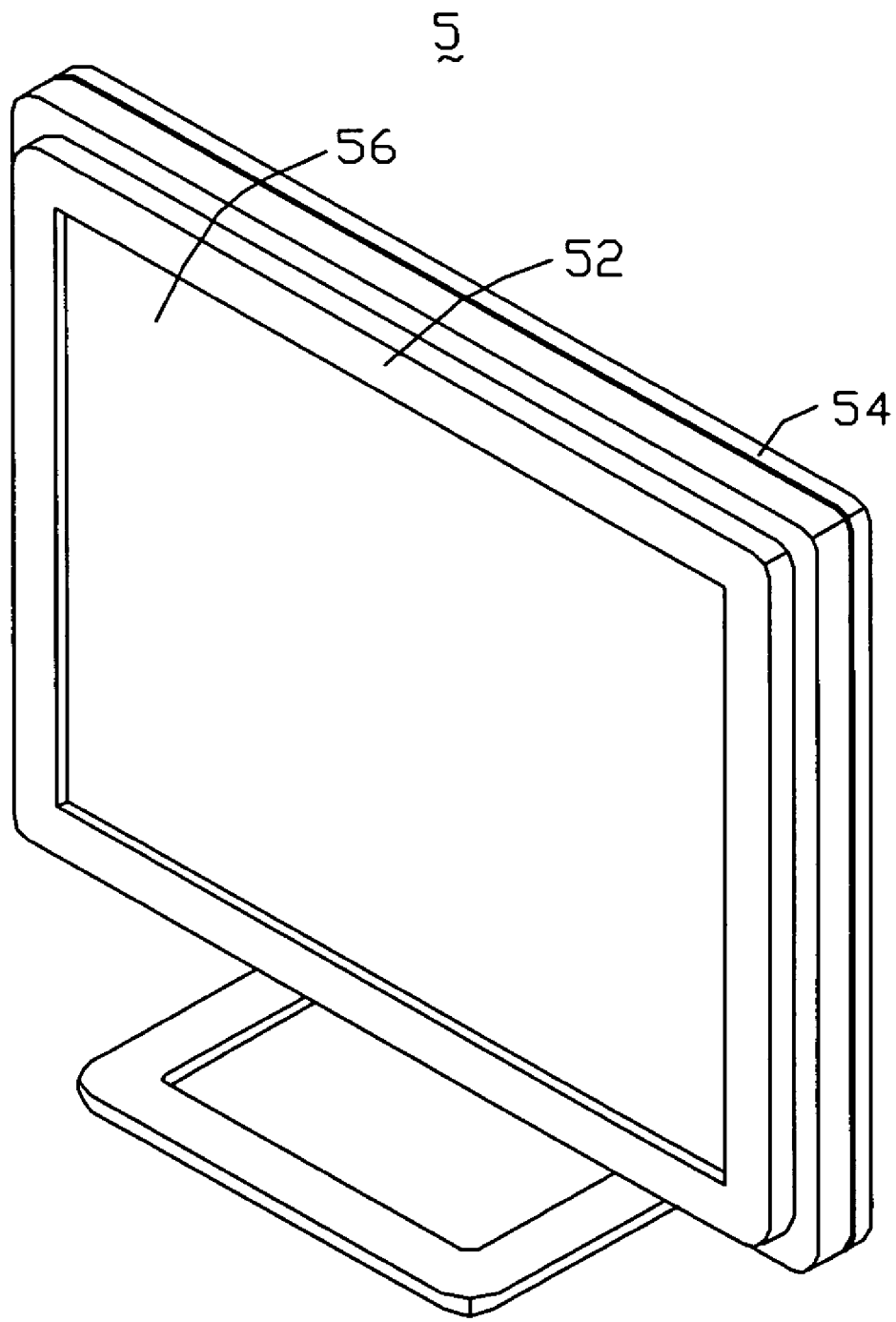
FIG. 5 is an assembled, isometric view of a conventional flat panel display.

Referring also to FIG. 4, when the holding frame 32 is assembled the main body 30, slim objects (not shown) such as pieces of paper, cards, photos and so on can be inserted into each of the slim cavities 326 via their respective entrances. Because the holding frame 32 is transparent, written contents on the objects received in the slim cavities 326 can be conveniently read. The flat panel display 3 has advantages similar to those of the above-described flat panel display 1.

Further or alternative embodiments may include the following. In one example, the blocks 128 can protrude from the horizontal walls 122 of the holding frame 12. In this case, the grooves 134 are correspondingly defined in horizontal sides of the front frame 13. In another example, the slim cavities 326 can be defined in top portions of the holding frame 32.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. A flat panel display comprising:
   a main body comprising a front frame, a back cover cooperatively defining a space with the front frame, and a display panel received in the space, the front frame defining two grooves in left and right sides thereof; and
   a transparent holding structure fixed to the front frame of the main body, the holding structure comprising a plurality of protrusions extending therefrom and two blocks protruding from left and right sides thereof, the blocks being respectively fixed in the grooves, and the protrusions abutting the front frame such that one or more thin insertions can be held between the protrusions and the front frame.

2. The flat panel display in claim 1, wherein the front frame defines a window for allowing viewing of the display panel.

3. The flat panel display in claim 1, wherein the protrusions extend from left and right sides of the holding structure.

4. The flat panel display in claim 3, wherein the protrusions of each side are regularly arranged in a plurality of columns.

5. The flat panel display in claim 1, wherein the holding structure further defines a plurality of slim cavities in sides thereof.

6. The flat panel display in claim 5, wherein the slim cavities are defined in two opposite left and right sides of the holding structure.

7. The flat panel display in claim 1, further comprising a base supporting the main body.

* * * * *